United States Patent [19]

Winiasz et al.

[11] 4,199,291
[45] Apr. 22, 1980

[54] VELOCITY COMPENSATOR ASSEMBLY IN A HORIZONTAL ARTICLE CONVEYOR SYSTEM

[75] Inventors: Michael E. Winiasz; James M. Long, both of Lorain, Ohio

[73] Assignee: A-T-O Inc., Willoughby, Ohio

[21] Appl. No.: 895,815

[22] Filed: Apr. 12, 1978

[51] Int. Cl.² .................. B65B 21/02; B65B 69/00; B65G 65/02
[52] U.S. Cl. .................................. 414/416; 198/479
[58] Field of Search ............ 214/309, 1 BA; 198/798, 198/800, 479; 414/416; 53/247; 141/168

[56] References Cited

U.S. PATENT DOCUMENTS

| | | | |
|---|---|---|---|
| 3,298,536 | 1/1967 | Zippel | 198/798 X |
| 3,938,847 | 2/1976 | Peyton | 214/309 X |
| 3,951,285 | 4/1976 | Barker | 214/309 |

Primary Examiner—Stephen G. Kunin
Assistant Examiner—Edmond G. Rishell, Jr.
Attorney, Agent, or Firm—Oldham, Oldham, Hudak & Weber Co.

[57] ABSTRACT

Article packing or unpacking apparatus, including two correlated driven conveyors one for articles and one for moving cases through a fixed course having a horizontal section and with both conveyors having fixed orbits, the article conveyor being in a vertical plane above the one conveyor horizontal section; and article grippers are positioned by carrier bars engaged with the article conveyor, which grippers depend from the carrier bars in a lower reach of such article conveyor. A pair of control arms are individually secured to each carrier bar at different ends thereof to engage guides as the article conveyor is moved downwardly towards an inflection area so that the article grippers are presented on vertical axes as they are moved into, along with, and lifted from cases moving through the horizontal section of the case conveyor fixed course.

15 Claims, 6 Drawing Figures

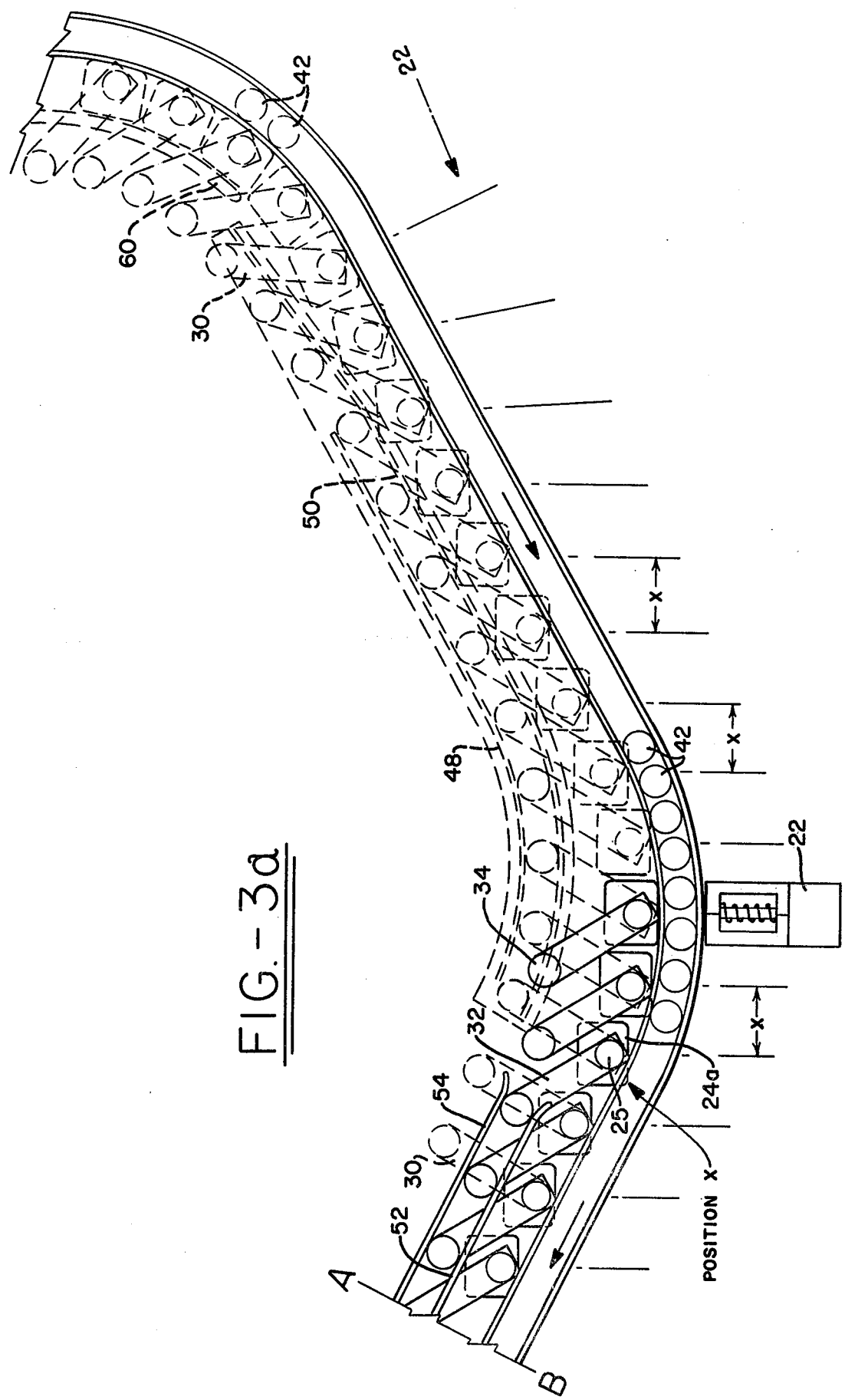

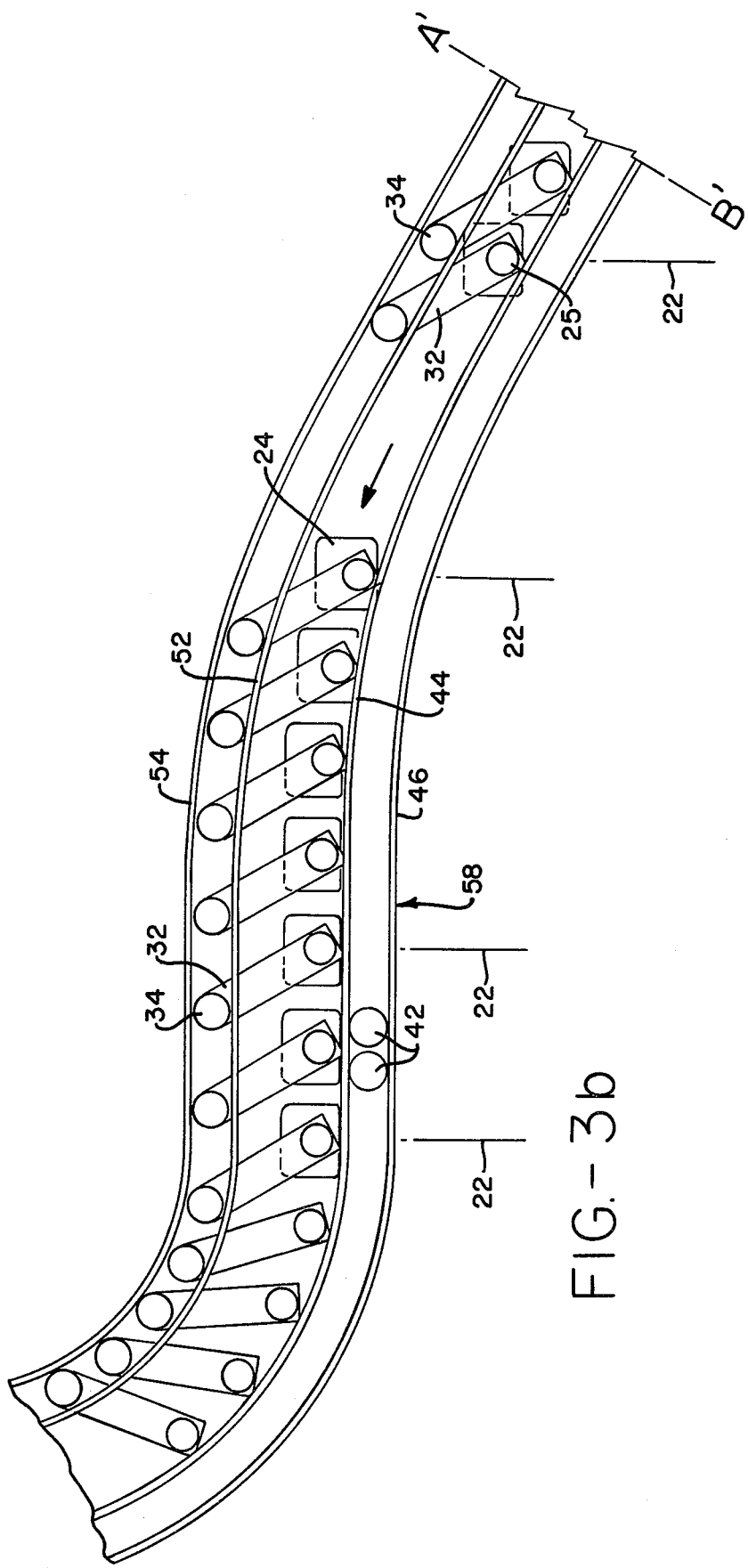

VELOCITY COMPENSATOR ASSEMBLY IN A HORIZONTAL ARTICLE CONVEYOR SYSTEM

BACKGROUND OF THE INVENTION

As is well known, the soft drink and beer industries, as well as other industries, process a very large number of bottles or other containers every day and bottle and article processing apparatus as made and sold commercially today must operate rapidly, safely and dependably in filling carrier cases completely with articles to be packaged therein and in removing all articles from filled cases that are being unloaded. The apparatus also should be readily adjustable to handle cases of different sizes. Efforts are continually being made to increase the speed of operation of article and bottle casing and uncasing apparatus and to improve the dependability and efficiency thereof. One U.S. Pat. No. 3,951,285, is designed to automatically lift containers, especially bottles, from moving cases and then to deposit them onto a second conveyor at a remote spot. This patent utilizes a series of closely adjacent, self-operating grippers that are carried along an endless path above a moving case or cases that are to be emptied. The patented apparatus moves the grippers through a fixed orbit including a descending angular path approaching a bottom or inflection point for article engagement and change in direction of movement of the grippers to an upwardly inclined angle. The patent teaches that the speed of the chains moving the gripper jaws through an orbit in the vertical plane must be slightly greater than the speed of the conveyor controlling flow of filled cases through the apparatus so that there is a horizontal velocity component of the gripper jaw moving chains equal to the speed of movement of the case control conveyor.

Such prior patent utilizes a plurality of gripper fingers or means therein that are substantially longitudinally abutted in the control apparatus. The patent has no means adapted to position gripper members in positions correlated with the articles in a case to be loaded or unloaded.

The general object of the present invention is to provide article gripper means in bottle uncasers and the like wherein the article gripper means are arranged in groups corresponding to the articles to be positioned in or removed from the case whereby accurate alignment and article engagement action can be obtained, and also to move the article gripper means through a controlled orbit and correlate the speed of the gripper means at the inflection area with the speed of movement of the articles in the filled cases.

Another object of the invention is to mount gripper means on carrier bars extending transversely of the apparatus in fixed dependent angular relation thereto whereby the position of the gripper means in relation to the vertical can be controlled through the carrier bars that are operatively connected to driven control conveyors.

Other objects of the invention are to provide a pair of control arms engaging each gripper means carrier bar in the article processing apparatus whereby the carrier bar, that is pivotally positioned, can be controlled to make the article gripper means, positioned by the bar, be on a vertical axis while the carrier bar is moved towards, through and past the inflection area or point; to control the positions of carrier bars and the article gripper means positioned thereby through article engaging, deposit and/or release stations or portions of the apparatus, but yet to permit merely a general control action of the carrier bars and the positioning thereof throughout the remaining portion of the closed orbit of the carrier bars as determined by their drive conveyors; to utilize mechanical members requiring a minimum of maintenance thereon for effectively controlling the positions of gripper means in article casing and uncasing apparatus; to position certain pantograph members, drive chain means and guide rollers for carrier bars, on common axes, and to position the gripper carrier bars on axes radially internally of the conveyor orbit to aid in controlling the speed of movement of the article gripper means on the carrier bars at the inflection area or point in the apparatus.

Another object of the invention is just to improve the dependability, speed and efficiency of article uncasing and casing apparatus.

The foregoing and other objects and advantages of the invention will be made more apparent as the specification proceeds.

BRIEF DESCRIPTION OF THE DRAWINGS

Reference now is particularly directed to the accompanying drawings, wherein:

FIG. 3a is a diagrammatic view of the carrier bars, article gripper means, and control means as moving towards the article engaging inflection area of the article conveyor path;

FIG. 3b is a diagrammatic view, like FIG. 3a, of such members moving from the inflection area;

When referring to corresponding members shown in the drawings and referred to in the specification, corresponding numerals are used to facilitate comparison therebetween.

SUBJECT MATTER OF INVENTION

Figure 1:
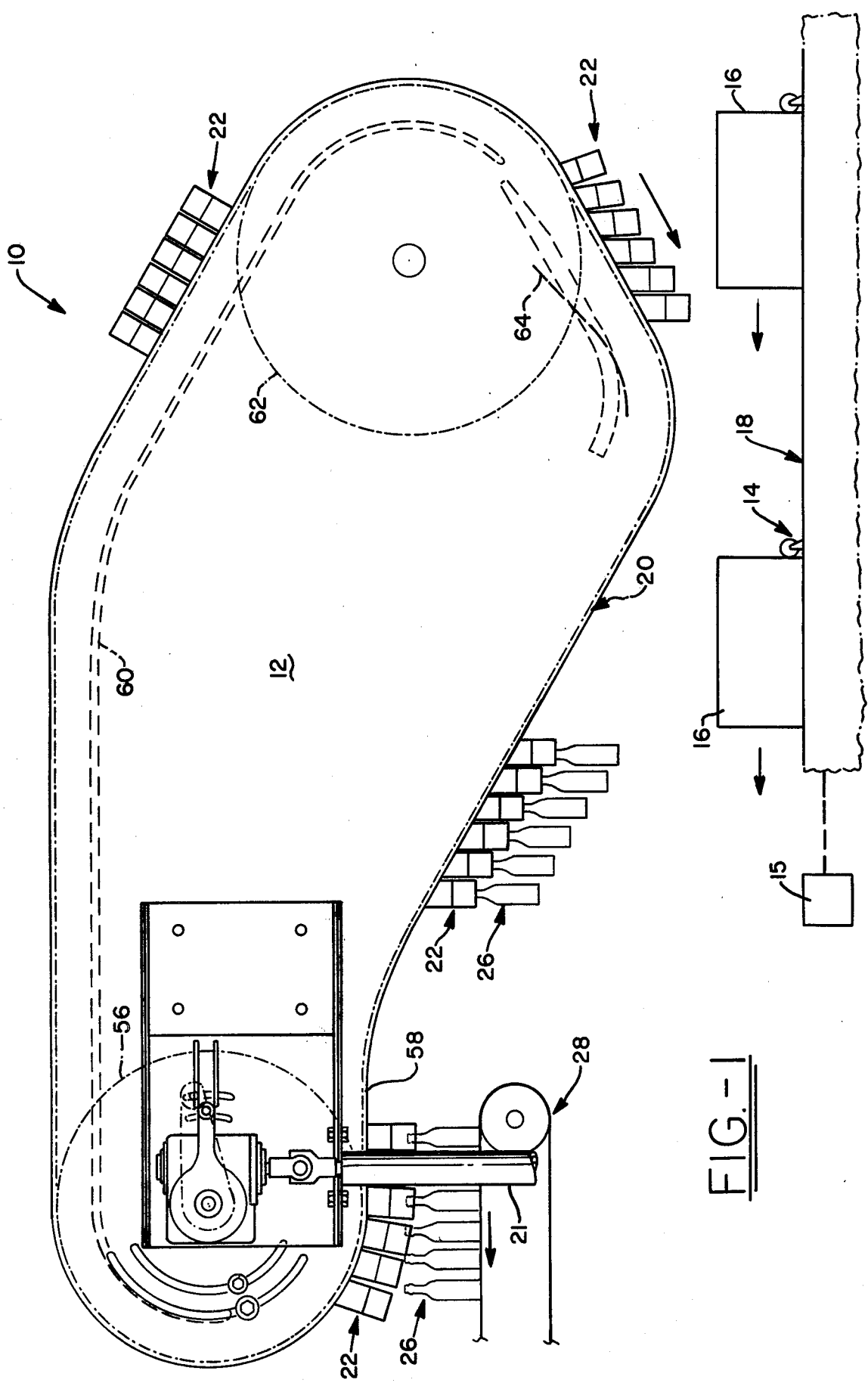
FIG. 1 is a diagrammatic view of article uncasing apparatus of the invention.

This invention, as one embodiment thereof, relates to a case unpacker including a frame, a driven case control conveyor for moving filled cases through a fixed course having a horizontal section, and a driven article conveyor means having a fixed orbit in a vertical plane above the conveyor horizontal section, article gripper means and carrier bars for the article gripper means operatively connected to and moved by the article conveyor means, the article gripper means normally depending from the carrier bars in fixed angular relation thereto; the invention comprising the improvement of a pair of control arms for each of the carrier bars, which control arms are individually and fixedly secured to different ends of the carrier bars and extend therefrom in planes perpendicular to the longitudinal axis of the carrier bar, the driven article conveyor means having a course extending downwardly towards the horizontal section of the case conveyor course at an acute angle thereto and then upwardly from an inflection area in the apparatus at an acute angle to the horizontal, which inflection area is the area of engagement of the gripper means on a carrier bar with an article in a case on the driven conveyor, and guide means on the frame to engage one of the control arms as its said gripper carrier bar is descending towards and through the inflection area and to engage the other control arm as the same said carrier bar moves upwardly from the inflection area, whereby the article gripper means can be maintained in vertical positions as they move to and from the inflection area to facilitate article engaging action and removal from the carrier cases.

REFERENCE APPLICATIONS AND DISCLOSURES

In the article packing or unpacking apparatus of the invention, preferably the case feed control means are of the type shown in our companion co-pending application Ser. No. 879,129, filed Feb. 21, 1978. The bottle gripping devices used in the invention can be of conventional type, but those shown in co-pending application Ser. No. 845,460 are preferred. We practice the present invention with a carrier bar and gripper jaw assembly and means as shown in and described in our co-pending application Ser. No. 879,128, filed Feb. 21, 1978. The details of construction and operation of the orbital conveyor forming the article carrying portion of the apparatus is of the type shown and described in more detail in our co-pending application Ser. No. 879,130, filed Feb. 21, 1978 now U.S. Pat. No. 4,147,265 upon adjustable apparatus for case loading and unloading. The foregoing applications are all assigned to A-T-O- Inc.

GENERAL APPARATUS

Attention now is directed to the main components of the structure shown in the drawings, and an article unpacker is illustrated therein and is indicated as a whole by the numeral 10. Such article or case unpacker includes conventional frame means 12 and a driven case control conveyor 14 for moving cases 16 through a fixed course having a horizontal course or section 18 mounted on the frame. The conveyor 14, frame 12 and section 18 are indicated diagrammatically in FIG. 1. The overall apparatus and frame means are shown diagrammatically in FIGS. 1 and 2 of the drawings, and they include a fixed support unit for mounting the various components of the apparatus in operative relationship with each other. Such components include a second chain driven conveyor or article conveyor means 20 positioned above the conveyor horizontal section 18, as indicated best in FIG. 1. The article conveyor means operatively positions and controls a plurality of article gripper means 22 that are operatively secured to and positioned by carrier bars 24, FIG. 4, that extend transversely of the apparatus and particularly transversely of the orbit of the conveyor means 20 and the vertical plane defined thereby.

The article carrier conveyor means 20 is adapted to pick up suitable articles, such as bottles 26, that are in the cases 16 and lift them therefrom and carry such bottles up to a second portion in the conveyor means orbit wherein an article deposit, horizontally extending conveyor means 28 is provided and the conveyor means 20 and associated mechanism is adapted to deposit these articles 26 onto the article deposit conveyor 28 for transfer thereby for further processing in any desired manner.

The article gripper means 22 are adjustable in positions to adapt the apparatus to function with different sizes and types of cases 16. Case engaging groups of the article gripper means are present at suitably spaced portions longitudinally of the article conveyor 20.

APPARATUS DETAILS

Figure 4:
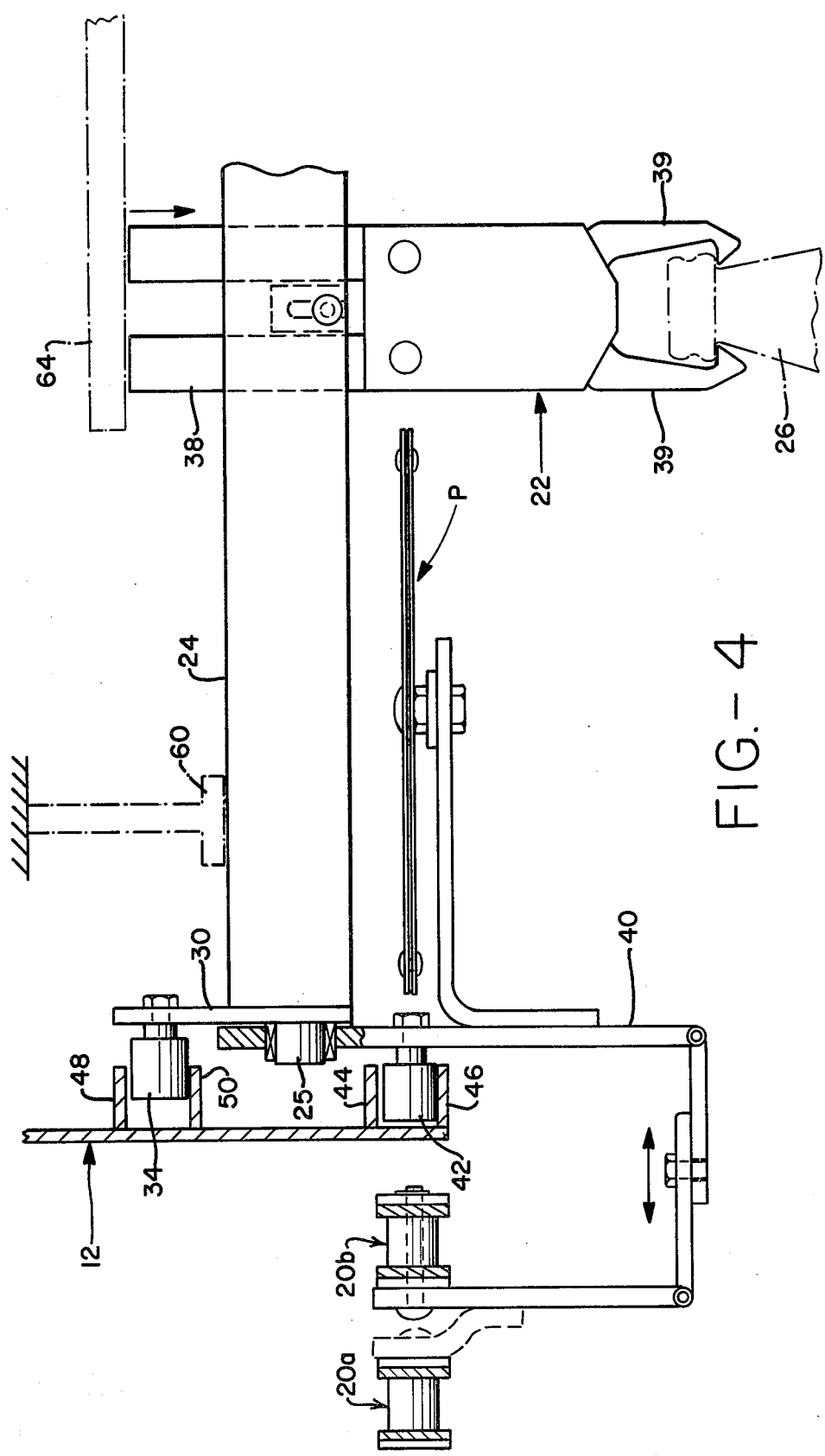
FIG. 4 is a fragmentary enlarged elevation, partially shown in vertical section, of a carrier bar and an article gripper jaw and associated mounting means and drive means therefor in the apparatus.
Figure 5:
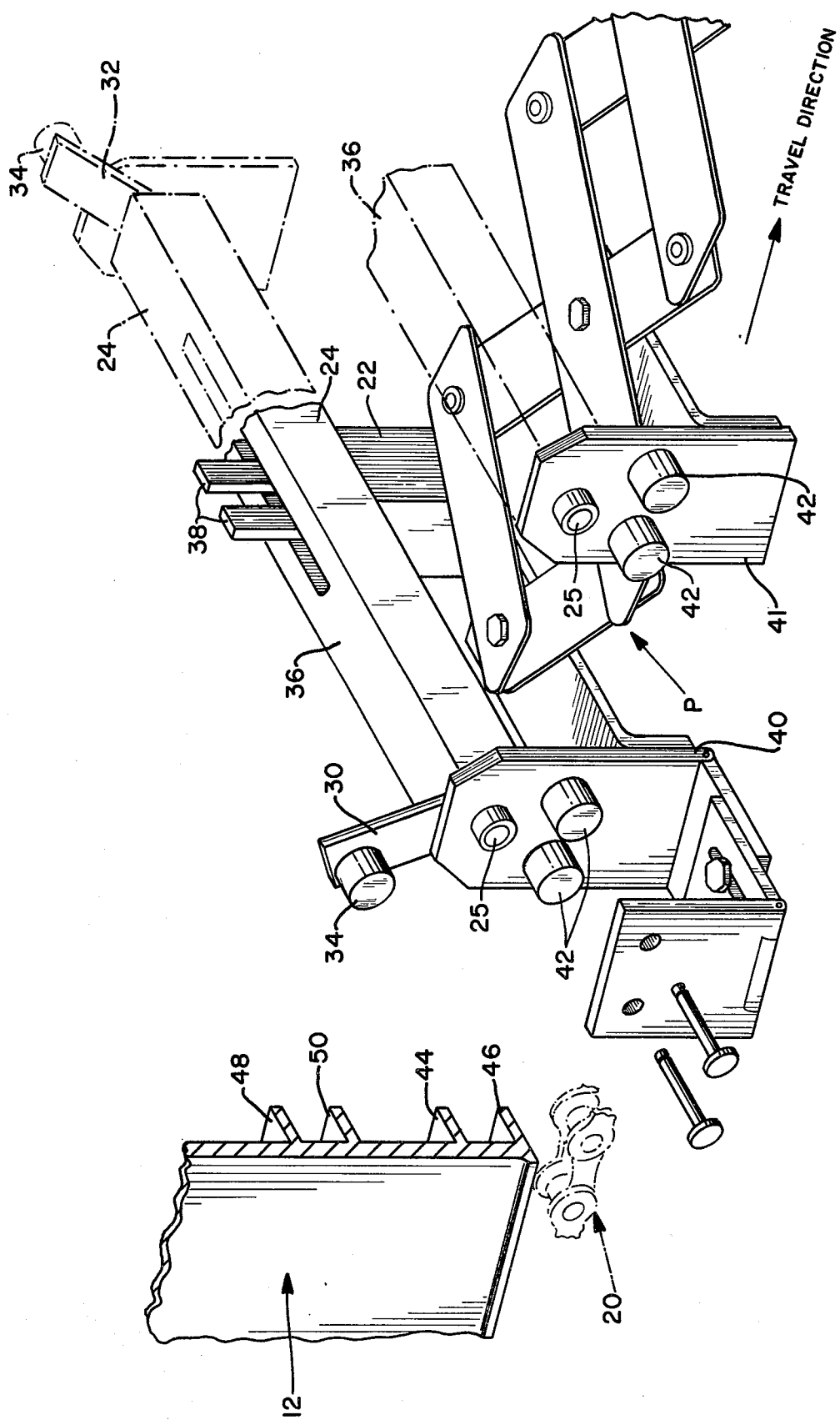
FIG. 5 is a perspective view, partially shown in vertical section, of a portion of the apparatus particularly including a gripper jaw means, carrier bar and associated mounting members and the pantograph unit in the apparatus.

Reference now is directed to FIGS. 4 and 5 wherein control arms 30 and 32 are shown together with other details of the apparatus associated with the carrier bars 24. These control arms 30 and 32 are fixedly secured to each individual carrier bar 24 at stub shafts 25 at opposite ends thereof and with the control arm 30 extending from the longitudinal axis of the carrier bar 24 at a rearwardly directed obtuse angle to the path of movement of the bar 24 and with the control arm 32 extending from the opposite end of the article carrier bar 24 in the opposite general direction at an obtuse angular relationship with the path of movement of the bar. Furthermore, these control arms normally lie in and define planes that are normal to the longitudinal axes of the carrier bars. Each control arm has a guide or roller 34 journalled thereon. The gripper carrier bars 24 normally have substantially flat top or inner surfaces 36 and upper end portions or fingers 38 of the article gripper means protrude through these carrier bars. The grippers 22 are resiliently supported on the carrier bars, and fingers 38 can be moved downwardly towards the carrier bars for controlling opening and closing actions on the article gripper fingers 39 provided at the bottom of the article gripper means. The carrier bars 24 are operatively positioned in the case unpacker 10 by members as described in our co-pending application Ser. No. 879,130 and including dependent brackets 40 pivotally positioned on ends of the carrier bars and a pair of guides or rollers 42,42 are journalled on the brackets 40 for engaging cam flanges 44 and 46. These cam flanges are suitably operably secured to the frame 12 to aid in controlling the fixed orbit through which the carrier bars 24 are moved by the article conveyor means 20. The conveyor means 20 comprise two different conveyors 20a and 20b all as described in more detail in our co-pending application Ser. No. 879,130 and a second type of a bracket 41 engages the carrier bars 24 intermediate the ends of a case engaging group of such bars to mount it for drive through the orbit of the conveyor 20.

For the positive control action desired on the carrier bars 24 and gripper means 22 positioned thereby, these rollers 34 on the control arms 30 and 32 are shown engaged, FIG. 4, with a pair of cam tracks or guide means 48 and 50 that are operatively secured to the frame 12. These cam tracks vary in spaced relationship from the orbital axis of the control and drive conveyor means 20 for the articles being transported in the case unpacker, as later described.

Figure 2:
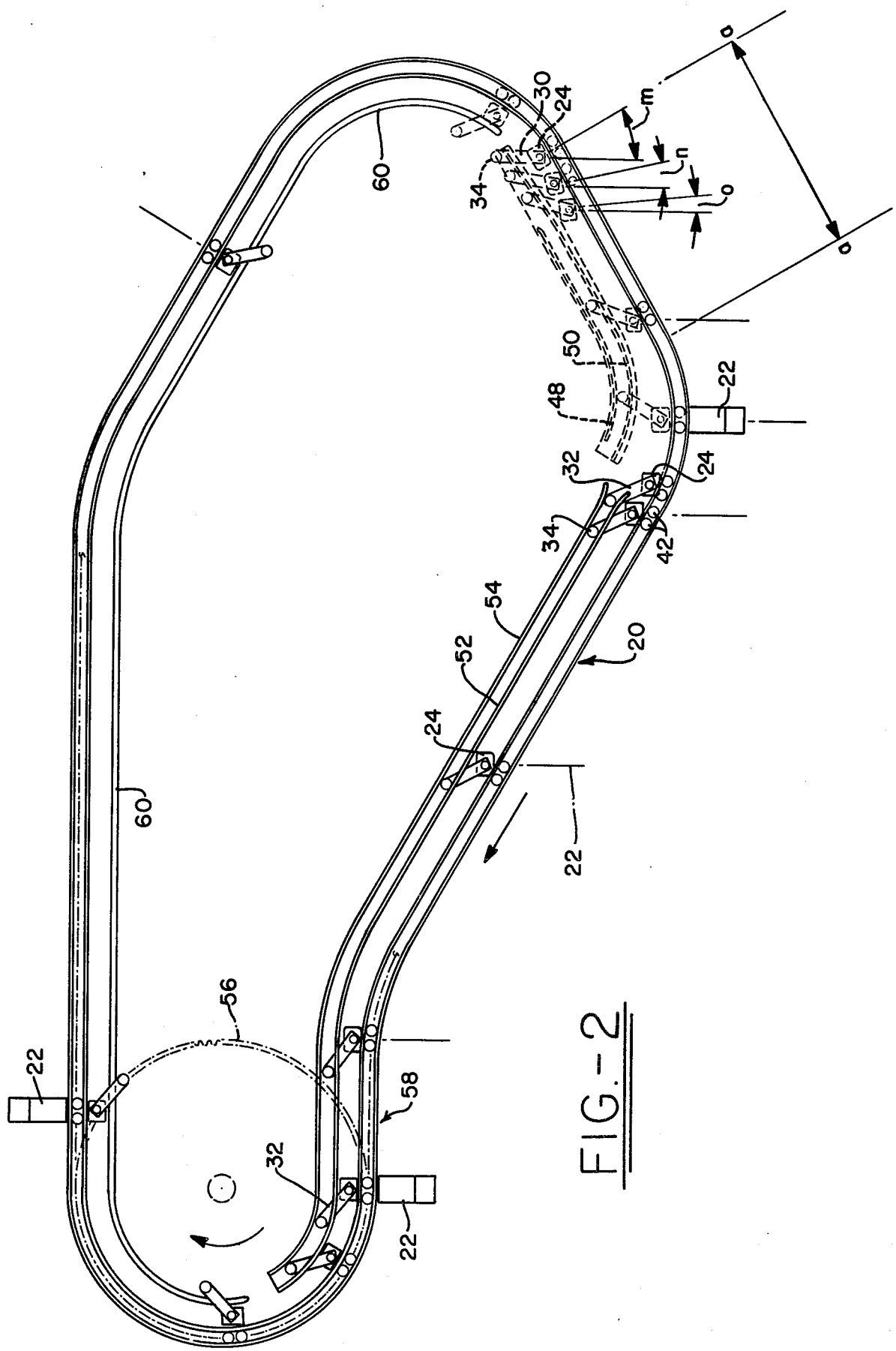
FIG. 2 is a further diagrammatic side elevation of the article uncasing apparatus of FIG. 1 indicating the article gripper means being retained on vertical axes at portions of the orbit path.

FIG. 1 of the drawing indicates the orbit of the article conveyor means 20, while FIG. 2 better shows the pair of guide cam tracks 48 and 50 in the descending straight line path a—a of the conveyor means as the apparatus is approaching an inflection point or area at the lowest portion in the orbit of the article conveyor means 20 whereat the article pick-up or deposit action is obtained dependent upon whether an article uncasing or casing action is being provided. FIG. 2 brings out that the track 50 is longer than the track 48 so that the roller 34 on the control arm will initially engage the cam track 50 and will be brought in between the tracks 48 and 50 for effective control in the angular relationship of the control arm 30 to the vertical as the carrier bar 24 to which it is secured is moved downwardly towards the inflection area. Gradual pivotal movement of the arm 30 backwardly is produced by the cam tracks so that the carrier bar is turned slightly on its longitudinal axis as it is moved towards the inflection area by the drive conveyors 20a and 20b. This in turn varies the positions of the gripper means 22 to provide desirable maintenance of the gripper means on vertical axes as the carrier bars 24 are moved towards and through the inflection area of the apparatus. Note that these bars are moved to horizontal positions at the inflection area from tilted positions upstream of such area.

As a further important feature in the design and construction of the guide and control means in the apparatus, a second pair of guide tracks or cam plates 52 and 54 are provided on the frame means in the ascending portion of the orbit of the conveyor means 20 after passing through the article engaging inflection area. Now at this time, the conveyor means 20 rises along a straight line conveyor path at an acute angle to the horizontal. The opposite control arm 32 on the individual carrier bars engages these cam plates 52 and 54.

FIGS. 2 and 3 of the drawings best show how these arms 30, that are diagrammatically indicated as being on the far lateral side of the apparatus 10 of the invention, are at an angle extending downstream or backwardly of the orbital path of the article conveyor means 20 whereas the control arms 32 are indicated as being on the near side of the apparatus and form angles with the vertical that are extending generally upstream of the orbital path of the conveyor means 20. Frame means and associated members are omitted in FIG. 2 to show the guide and position control members primarily. The relationship of the cam tracks 52 and 54 to the orbital axis of the conveyor means 20 varies in spacing as do the cam tracks 48 and 50 whereby the angular relationship of these control arms 30 and 32 to the vertical and hence the pivotal position of the carrier bars 24 is varied slightly with the ascending path of the conveyor means so as to maintain the suspended or dependent article gripper means 22 on vertical axes. As the carrier bars are moved up by the conveyor means 20 engaging a sprocket unit 56, the orbit of the conveyor means 20 is varied from an ascending substantially straight line path through a gradual curve to a substantially horizontally directed conveyor course indicated at 58. This course 58 is above and adjacent to the article deposit conveyor 28 and the speed of movement of the individual gripper fingers and the orbit controls therefor are such so as to be moving the article gripper means 22 along a horizontal course at the same speed as the article deposit conveyor 28 for smooth deposit of articles onto the conveyor for further processing action.

It is desirable to maintain the article gripper means 22 in relatively fixed or controlled positions as they are moved through the inoperative portion of the orbit of the conveyor means 20. Hence, a suitable control cam rail or the like 60 is fixedly positioned by the frame means 12 to engage the flat surfaces of the carrier bars 24 and maintain them in fixed relationship to the conveyor means 20 as they are moved through the upper portion of the orbit of the conveyor means and to then release the carrier bars for individual controlled pivotal positioning thereof as the conveyor means starts its descending path after passage around a sprocket unit 62.

The conveyor means 20 are driven and/or adjusted in speed by members fully described and shown in our companion co-pending application Ser. No. 879,130 and including a drive shaft 21.

The gripper jaws are opened when the fingers 38 are moved downwardly, but the spring action in the gripper means 22 normally moves the gripper means jaws and/or fingers 39 into article engaging or retaining positions.

So as to control article engaging and release action, suitable cam plates of known construction are provided in the apparatus 10 of the invention and are secured to the frame means 12. One typical cam control plate 64 is indicated in FIG. 1 to engage the upper ends of the fingers 38 as the individual carrier bars 24 are brought down towards the inflection area by the conveyor orbit to engage the cam plate, which is positioned above and adjacent to the inflection area in the apparatus. Hence, as the gripper jaws are moved towards article engaging positions at the inflection point, the jaws 39 are open by the control plate 64 engaging the fingers 38, but then the cam plate 64 terminates and the jaws are permitted to spring to a closed article engaging position. Conveyor movement then lifts the articles out of the associated carrier cases 16 with the rising straight line movement of the conveyor means 20, and the maintained vertical axes of the gripper means.

A similar cam plate (not shown) to the cam plate 64 is provided adjacent the sprocket means 56 for engaging with the fingers 38 of the article gripper means to move the gripper jaws to article release or open positions as these gripper means 22 and their carrier bars move into engagement with the sprocket and deposit articles upon the conveyor 28. The cam tracks 44 and 46 of course are designed to provide the desired path for the closed loop orbit of the conveyor means 20.

It will be understood that the invention provides a positive, accurate control for the positioning of the article gripper means 22 in their depending relationship to the carrier bars 24 as such bars are moved into and through the inflection area or point in the apparatus wherein the gripper means have been lowered into the cases for engagement with articles therein for lifting them from the cases as the conveyor 14 moves the cases along in under the orbital path of the article conveyor means 20. A smooth unhampered removal of the articles from the cases is provided by the vertically maintained positions of the gripper means 22 as they approach the inflection point and as they move away from the inflection point.

So as to maintain complete operative control of the individual carrier bars at all times, the apparatus has the control arms 30 and flanges 48 and 50 positively controlling the exact pivotal position of the carrier bars 24 as they move downwardly towards and pass through the inflection area at the lowermost point in the orbit of the conveyor means. However, just as such control arm 30 is being released by its control cam plates, the oppositely directed control arm 32, FIG. 3a, has previously just been brought into operative engagement with one or usually both of its cam plates 52 and 54. Hence, at this one position X, the carrier bar 24a at such position is retained against pivotal movement on its shafts 25 to maintain its gripper means on a vertical axis after having been moved arcuately upstream of the conveyor orbit by change of the angular position of the control arm 30 in relation to vertical lines. Now as the gripper carrier bar 24a starts to be elevated in the apparatus, it will be maintained by this opposite control arm 32 and its roller engagement with its cam tracks 52 and 54 into a desired, gradually changing pivotal relationship to the longitudinal axes of the carrier bars and/or to a vertical line extending through the longitudinal axes of the carrier bars whereby the article gripper means 32 are maintained on vertical support axes for effective control of article pick-up and deposit by the apparatus.

From adjacent the conveyor 28, for the remaining portion of the orbit of the article conveyor means 20, neither of the control arms 30 and 32 are engaged with any cam tracks and such arms just can move freely without opposition in the apparatus as the cam plate or guide 60 controls the actions and positions of the carrier bars in relation to the orbit of the conveyor means 20.

FIGS. 3a and 3b are diagrammatic views of the main positioning control members in the apparatus. And they show the progressive changes in relative positions of the control arms 30 and 32 to the carrier or support bars 24. In practice in the apparatus, of course, the carrier bars 24 connect to the conveyor means in sets spaced longitudinally of each other in the conveyor orbit. The bars 24 are of generally rectangular shape in vertical section and the gripper means can move on their vertical axes in relation to the mounting or carrier bar but it can not move in an arcuate direction centered on the bar axis so that a fixed unit of the control arms, bars 24 and gripper means 22 is presented to the cases 16 for article pick-up.

As disclosed in detail in our co-pending application Ser. No. 879,128, the article gripper means 22 are movable laterally of the individual carrier bars 24 and thus as these individual carrier bars are processed around the sprocket means 56, usually suitable and conventional guide channel means or the like similar to those disclosed in U.S. Pat. No. 3,951,285 engage the fingers 38 and control the gripper means 22 position laterally of the carrier bars. The gripper means can be brought into closely adjacent lateral relation after moving around the sprocket means 56 and then next be laterally positioned on the carrier bars in correlation to the transverse article rows in the cases 16 being processed.

The apparatus of the invention achieves a positive control on the suspended positions on the article gripper means 22 as depending from the carrier bars 24 in the conveyor reach a—a. The gripper means 22 are gradually moved through angles m, n and o of decreasing extent to the vertical and then to be on a vertical axis.

It should be noted that by having the center lines of movement of the carrier bars 24 be internally of the enclosed orbit of the article conveyor means 20 and associated positioning members, this combines or moves the gripper means 22 slightly closer together to each other when the article drive and control conveyor means 20 are moving down into, through and around the inflection point or area of the apparatus. But the pitch increment of the gripper means "x" remains substantially constant. This facilitates their entry into the associated cases and engagement with the bottles or articles therein. It also should be seen that the velocity of the chain conveyors 20 is constant and that the velocity of the carrier bars 24 is less than that of the conveyors 20 at the inflection area. But the carrier bars have a horizontal velocity at the inflection area substantially equal to that of the case control conveyor 14.

It should be appreciated that any reasonable angular relationships can be provided between the straight downwardly inclined path of the conveyor means 20 in relation to a horizontal plane. In all instances, the relative speeds of the case drive and control conveyor 14 and the article conveyor 20 must be correlated in such a manner that the horizontal movement of the individual carrier bars 24 and the article gripper means 22 thereon as moved through the inflection area of the apparatus is substantially or almost exactly the same as that of the cases being controlled and moved through the apparatus by the case conveyor 14.

All of the carrier bars 24 are driven by the conveyor means even if not directly secured thereto, as the pantograph means P form units of a plurality of the carrier bars 24 that have mounting and drive means, as shown in FIGS. 4 and 5, also provided at the other end of the bars. It will be realized that the brackets 40 are at each end of a pantograph unit and attach to individual conveyors 20a or 20b as indicated in FIG. 4.

From the foregoing, it is believed that the apparatus of the invention provides an effective, positive mechanical control for maintaining the article gripper means 22 and the actual gripper fingers or jaws in operative vertical axis positions in the apparatus. This operation is provided by the relationship between the carrier bars 24, control arms 30 and 32, brackets 40 and 41, rollers 42, 42 and the relationship of the conveyor means 20 and the longitudinal axes of the rollers 42 in relationship to the normal operative plane of the pantograph means P used for connecting a plurality of the carrier bars into a case engaging set of carrier bars. Hence, we assemble the gripper finger means into sets or groups corresponding to the groups of articles in cases to be processed. It should be noted that the progressive positions of a control arm are shown diagrammatically in FIGS. 3a and 3b, and that the set of tracks 48 and 50 are on a different lateral side of the apparatus than the set of tracks 52 and 54, as generally diagrammatically represented in FIG. 2.

A drive means 15 operably engages the case control conveyor 14 to drive it at a fixed speed slower than the speed of movement of the driven conveyor means 20. A drive member 21 operably connects to the driven conveyor means 20 to drive the same.

The apparatus mechanically and positively controls the positions of the gripper means for improved article uncasing action. The apparatus will function rapidly and automatically to achieve the objects of the invention.

While one complete embodiment of the invention has been disclosed herein, it will be appreciated that modification of this particular embodiment of the invention may be resorted to without departing from the scope of the invention.

What is claimed is:

1. In article unpacking apparatus including a frame, a driven conveyor for moving cases through a fixed course having a horizontal section, and a driven conveyor means having a fixed orbit in a vertical plane above said conveyor horizontal section, article gripper means, and carrier bars for said article gripper means operatively connected to and movable with said conveyor means, said article gripper means depending from said carrier bars in fixed angular relation thereto in a lower reach of said conveyor means orbit, the improvement comprising a pair of control arms for each said carrier bar, said control arms being individually fixedly secured to different ends of a said carrier bar and extending therefrom in different directions at similar obtuse angles to the path of movement of said carrier bar and defining planes perpendicular to said carrier bar's longitudinal axis, said driven conveyor means having a course extending downwardly towards said horizontal section at an acute angle thereto and then upwardly from an inflection area at an acute angle thereto, said inflection area being at the area of engagement of a gripper means with an article in a case on said driven conveyor, and guide means on said frame at only said downwardly and upwardly directed courses of said driven conveyor means, said guide means having one section to engage one of said control arms as its said gripper carrier bar is descending towards said inflection area and having a second section to engage the other of said control arms as its carrier bar moves from said inflection area upwardly whereby said gripper means can be maintained in vertical positions as they move to and from said inflection area, said one guide section terminating after said other of said control arms engages said second guide section.

2. In article unpacking apparatus as in claim 1, means for driving said conveyor at a fixed speed, means for driving said conveyor means at a greater speed than said conveyor, said carrier bars being positioned internally of the orbit of said conveyor means and said conveyor means being adapted to move a said carrier bar and its article gripper means at the inflection area at the speed in a horizontal direction substantially equal to that of said conveyor.

3. In a case unpacker including a frame, a driven conveyor for moving filled cases through a fixed course having a horizontal section, and a driven conveyor means having a fixed orbit in a vertical plane above said conveyor horizontal section, article gripper means, and carrier bars for said article gripper means operatively connected to and movable with said conveyor means, said article gripper means depending from said carrier bars in fixed angular relation thereto, the improvement comprising, a pair of control arms for each said carrier bar, said control arms being individually fixedly secured to different ends of a said carrier bar and extending therefrom in planes perpendicular to the longitudinal axis of said carrier bar, said driven conveyor means having a course extending downwardly towards said horizontal section at an acute angle thereto and then upwardly from an inflection area or zone at an acute angle thereto, said inflection area being the area of engagement of a gripper means with an article in a case on said driven conveyor, and guide means on said frame to engage only one of said control arms as its said gripper carrier bar is descending towards and through said inflection area and to engage only the other of said control arms as its carrier bar moves upwardly from said inflection area but with both control arms engaging said guide means for a short section of movement at said inflection area whereby said article gripper means can be maintained in constantly controlled vertical positions as they move to and from said inflection area.

4. In a case unpacker as in claim 3, where said control arms extend from said carrier bars in different directions at obtuse angles to the path of movement of said carrier bars and said arms extend inwardly of said orbit of said conveyor means to engage said guide means at inner ends of said arms, and the angle that a said control arm makes with a horizontal line varies as its said carrier bar moves down towards said inflection area.

5. In a case unpacker as in claim 4, where said control arms maintain said article gripper means on vertical axes by pivotal movement of said carrier bars regulated by said control arms having arcuate movement controlled by said guide means engaging the inner ends of said control arms.

6. In a case unpacker as in claim 3, means for driving said conveyor at a fixed speed, and means for driving said conveyor means at a greater speed than said conveyor, said conveyor means moving through an arcuate path at the inflection area, said carrier bars being operably connected to said conveyor means radially within said arcuate path so as to be moved at the speed of said conveyor at the inflection area.

7. In a case unpacker as in claim 3, where said carrier bars each have an attaching bracket pivotally secured thereto at each end thereof, a pair of roller means journalled on said bracket on a radially outer portion of said conveyor means orbit in relation to the position of said carrier bars, and guide flange means are provided on said frame to engage said roller means and determine the orbit for said carrier bars.

8. In a case unpacker as in claim 7, where said conveyor means includes drive chain means that move through a fixed orbit, and said roller means are mounted on axes aligned with portions of said drive chain means.

9. In a case unpacker as in claim 3, where said guide means on said frame comprise a pair of descending cam plates and a pair of ascending cam plates, and roller means on said control arms engaging said cam plates to control the positions of said carrier bars, said carrier bars being positioned for pivotal movement on their longitudinal axes.

10. In a case unpacker including a frame, a driven conveyor for moving filled cases through a fixed course having a horizontal section, and a driven conveyor means having a fixed orbit in a vertical plane above said conveyor horizontal section, article gripper means, and carrier bars for said article gripper means operatively connected to and movable with said conveyor means, said carrier bars being pivotal on their longitudinal axes, the improvement comprising, a pair of control arms for each said carrier bar individually fixedly secured to different ends of a said carrier bar, said driven conveyor means having a course extending downwardly towards said horizontal section at an acute angle thereto and then upwardly from an inflection area or zone at an acute angle thereto, said inflection area being the area of engagement of a gripper means which an article in a case on said driven conveyor, said article gripper means depending from said carrier bars in fixed angular relation thereto as moved downwardly by said conveyor means, guide means on said frame to engage one of said control arms as its said gripper carrier bar is descending towards and into said inflection area and to engage the other of said control arms as its carrier bar moves away from said inflection area, at least one control arm always engaging said guide means at said inflection area, said guide means changing the angular relation of a said control arm to the vertical to move said carrier bars pivotally on their longitudinal axes to control said article gripper means as they are moved to and from said inflection area.

11. In a case unpacker as in claim 10, means for driving said conveyor at a fixed speed, means for driving said conveyor means through a closed orbit at a greater speed than said conveyor, said carrier bars being operably positioned radially within the orbital path of said conveyor means so as to be moved downstream at the speed of said conveyor at the inflection area.

12. In a case unpacker as in claim 11 where a rigid unit is formed from each said pair of control arms, the said carrier bar to which such arms are secured, and the said gripper means carried thereby in so far as arcuate movement of the carrier bar on its longitudinal axis is concerned, said guide means including cam tracks, and such pivotal movement is controlled and provided by the spaced relationship of said cam tracks to the orbit of said conveyor means.

13. In a case unpacker as in claim 10, where said guide means on said frame comprises a pair of descending cam plates and a pair of ascending cam plates longitudinally spaced from said descending cam plates, roller means on said control arms engaging said cam plates to control the arcuate positions of said carrier bars, a bracket member pivotally engaging a said carrier bar and connecting it to said driven conveyor means, and control members on said bracket members to engage guide tracks on said frame to establish a control orbit for said carrier bar.

14. In a case unpacker including a frame, a driven conveyor for moving filled cases through a fixed course having a horizontal section, and a driven conveyor means having a fixed orbit in a vertical plane above said conveyor horizontal section, article gripper means, and carrier bars from which said article gripper means are vertically suspended in an inflection area, said bars being operatively connected to and movable with said conveyor means, said carrier bars being pivotal on their longitudinal axes, the improvement comprising, a pair of control arms for each said carrier bar individually fixedly secured to different ends of a said carrier bar and with one control arm extending upstream of the path of movement of its said carrier bar and the other control arm extending downwardly of such path, said driven conveyor means having a course extending downwardly towards said horizontal section and then upwardly from an inflection area or zone at an acute angle thereto, said inflection area being the area of engagement of a gripper means with an article in a case on said driven conveyor, guide means on said frame to engage one of said control arms as its said gripper carrier bar is descending towards and into said inflection area, and a second guide means to engage the other of said control arms as its carrier bar moves upwardly from said inflection area; a rigid unit relative to pivotal movement of said carrier bar being formed from each said pair of control arms, the said carrier bar to which such arms are secured, and the said gripper means carried thereby; and said guide means changing the angular relation of a said control arm to the vertical to move said carrier bars pivotally on their longitudinal axes to control the vertical position of said article gripper means as they are moved to and from said inflection area.

15. In a case unpacker as in claim 13, where said fixed orbit of said driven conveyor means is also determined by said control members on said bracket members, and said control members have longitudinal axes that are aligned with portions of said driven conveyor means.

* * * * *